United States Patent [19]

Johnsen

[11] Patent Number: 5,072,123
[45] Date of Patent: Dec. 10, 1991

[54] METHOD OF MEASURING TOTAL IONIZATION CURRENT IN A SEGMENTED IONIZATION CHAMBER

[75] Inventor: Stanley W. Johnsen, Palo Alto, Calif.

[73] Assignee: Varian Associates, Inc., Palo Alto, Calif.

[21] Appl. No.: 518,341

[22] Filed: May 3, 1990

[51] Int. Cl.[5] .............................................. G01T 1/185
[52] U.S. Cl. ................................... 250/385.1; 250/374
[58] Field of Search .................... 250/385.1, 388, 374; 378/117, 108, 97

[56] References Cited

U.S. PATENT DOCUMENTS

| | | | |
|---|---|---|---|
| 3,838,284 | 9/1974 | McIntyre et al. | 250/385 |
| 3,852,610 | 12/1974 | McIntyre | 250/385 |
| 3,942,012 | 3/1976 | Boux | 250/385.1 |
| 4,131,799 | 12/1978 | Stieber | 250/385 |
| 4,427,890 | 1/1984 | Taumann | 250/385 |
| 4,469,947 | 9/1984 | Allemand et al. | 250/385.1 |
| 4,520,495 | 5/1985 | Tanaka | 378/117 |

Primary Examiner—Carolyn E. Fields
Assistant Examiner—James E. Beyer
Attorney, Agent, or Firm—Sheri M. Novack

[57] ABSTRACT

Information on radiation dosage from segmented ionization chambers can be incomplete due to the existence of insensitive regions of the chamber. By measuring the total current to the high voltage power supply, the total ionization current including that in the insensitive areas can be estimated, thereby providing a measure of the dosage to the insensitive areas.

8 Claims, 4 Drawing Sheets

METHOD OF MEASURING TOTAL IONIZATION CURRENT IN A SEGMENTED IONIZATION CHAMBER

FIELD OF THE INVENTION

This invention pertains to a method and apparatus for estimating radiation dosage in insensitive areas of a segmented ionization chamber.

BACKGROUND OF THE INVENTION

Radiotherapy accelerators must have a means for monitoring the radiation delivered; modern machines use a transmission ionization chamber located in the beam path for this purpose. Typically, this chamber has signal electrodes divided into segments so as to measure the spatial distribution of the radiation beam. This invention is a means of measuring the total ionization current of the chamber independent of the measurement of the currents from each of the segments. Ionization occurring in volumes of the chamber to which the segments are unresponsive is included in this new means of current measurement. This provides assurance that the ionization chamber is providing an accurate measure of the radiation beam. Another approach would be to reduce the insensitive area of such signal electrodes.

In the dosimetry system of modern radiotherapy accelerators a segmented transmission ionization chamber is used to measure both total flux as well as the spatial distribution of the radiation beam.

Segmentation of the ion chambers is accomplished by dividing the signal, or low voltage electrode into a number of electrodes, as described in U.S. Pat. Nos. 4,131,799 and 3,852,610. These patents also describe appropriate construction techniques.

The total radiation flux is measured by electronically summing the signals originating from the various segments within the chamber. Spatial distribution measurements are obtained from the differential response of the various segments. Typical of such schemes is one described in U.S. Pat. No. 4,427,890. General descriptions of the schemes are given in ICRU Report 35 (International Commission on Radiation Units and Measurements, 1984) and in a review article by Karzmark (Medical Physics 11, pp. 123-124 (1984)).

Alternate schemes for monitoring the radiation field have included use of secondary emission foils in the beam path or use of a toroid pulse transformer around the beam. Both of these techniques work only for electron beams and are insensitive to photon or neutron beams.

A disadvantage of the prior art using segmented ionization chambers is that they have regions of insensitivity between the segments. This allows the accelerator to deliver radiation that may be undetected or inaccurately measured by the dosimetry system. Furthermore, the response of electronic circuits measuring the ionization current from various segments must be well matched if an accurate measure of total current is to be obtained by summing currents from these segments. Electronic circuits for measuring the currents from the chamber segments must be high quality because the currents are small and leakage currents are a problem.

In most accelerators the spatial information is also used to correctively tune the beam if an asymmetry is detected in the radiation flux. U.S. Pat. No. 3,838,284 covers this aspect of chamber design.

Shapes of the various segments are designed to provide information about various types of beam inhomogeneties which can result from a number of causes. This information can be used to drive servo systems which control the accelerator to correct such inhomogeneities and/or the information can operate interlock circuits to terminate radiation production if the spatial distribution of the beam is not correct. For example, U.S. Pat. No. 4,347,547 is a scheme whereby the beam intensity over a central electrode is compared to the sum of various outer segments to provide energy discrimination. Simultaneously the differences in beam intensity over the various outer electrodes provide information about the spatial symmetry in planes normal to the direction of the radiation beam.

A failure of one of the segments or its associated electronics may erroneously be interpreted by the system as a reduction and an asymmetry in the radiation flux. Should the control system try to correct this, a misapplication of the radiation beam may result. A means of measuring total ionization current independent of the segments is needed to verify the integrity of the segmented system.

OBJECTIVES OF THE INVENTION

It is therefore a primary objective of the present invention to provide a means of estimating ionization dosage in insensitive areas of a segmented ionization chamber.

It is a further objective of the invention to provide redundancy within the ion chamber system to check the integrity of the ion chamber elements.

SUMMARY OF THE INVENTION

These objectives of the invention and other objectives, features and advantages to become apparent as the specification progresses are accomplished by the invention according to which, briefly stated, the total current supplied to the ion chamber by the high voltage power supply is compared to the sum of the ionization currents from the various segments to obtain an estimate of the dosage to the insensitive areas of the segmented ionization chamber.

LIST OF ADVANTAGES OF THE INVENTION

This invention offers several improvements to present dosimetry and interlock systems of radiotherapy accelerators:

1. The total chamber current is monitored independently of the signals from the segments used for spatial monitoring.
2. The problem of insensitive areas between ion chamber segments is overcome.
3. The total ionization current is measured without the need for matched electronics summing the currents from several segments.
4. A measure of the amount of radiation passing through insensitive areas of the chamber can be obtained by comparing the measured total current to the sum from the several segments. This allows interlocking of the accelerator to terminate irradiation if the amount of radiation passing through insensitive areas is too great.
5. The scheme can be easily added to existing systems because the ionization chamber and its standard electronics need not be altered.
6. The signals are large enough that relatively simple electronic circuits are adequate to measure them. Indeed, the current supplied to the high voltage electrode of the ionization chamber is greater than or equal to the sum of currents from the segments.

7. In the case of pulsed radiation beams, if a transformer is used to monitor the pulsed currents from the high voltage supply, leakage within the chamber circuitry, which is direct current, is automatically eliminated.

8. A further advantage to using a toroid type of pulse transformer is that it is easily isolated from the high voltage supply for the chamber. Its isolation also provides good noise immunity.

9. A means for checking the integrity of the segments within the ionization chamber and their associated electronic circuits is possible. The sum of the segment currents should be a constant proportion of the total current supplied by the high voltage supply.

10. By enabling measurements of the current drawn by the high voltage electrode, additional capabilities for measuring spatial distributions of the radiation field can be accomplished by segmenting this electrode.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

GLOSSARY

Figure 1:
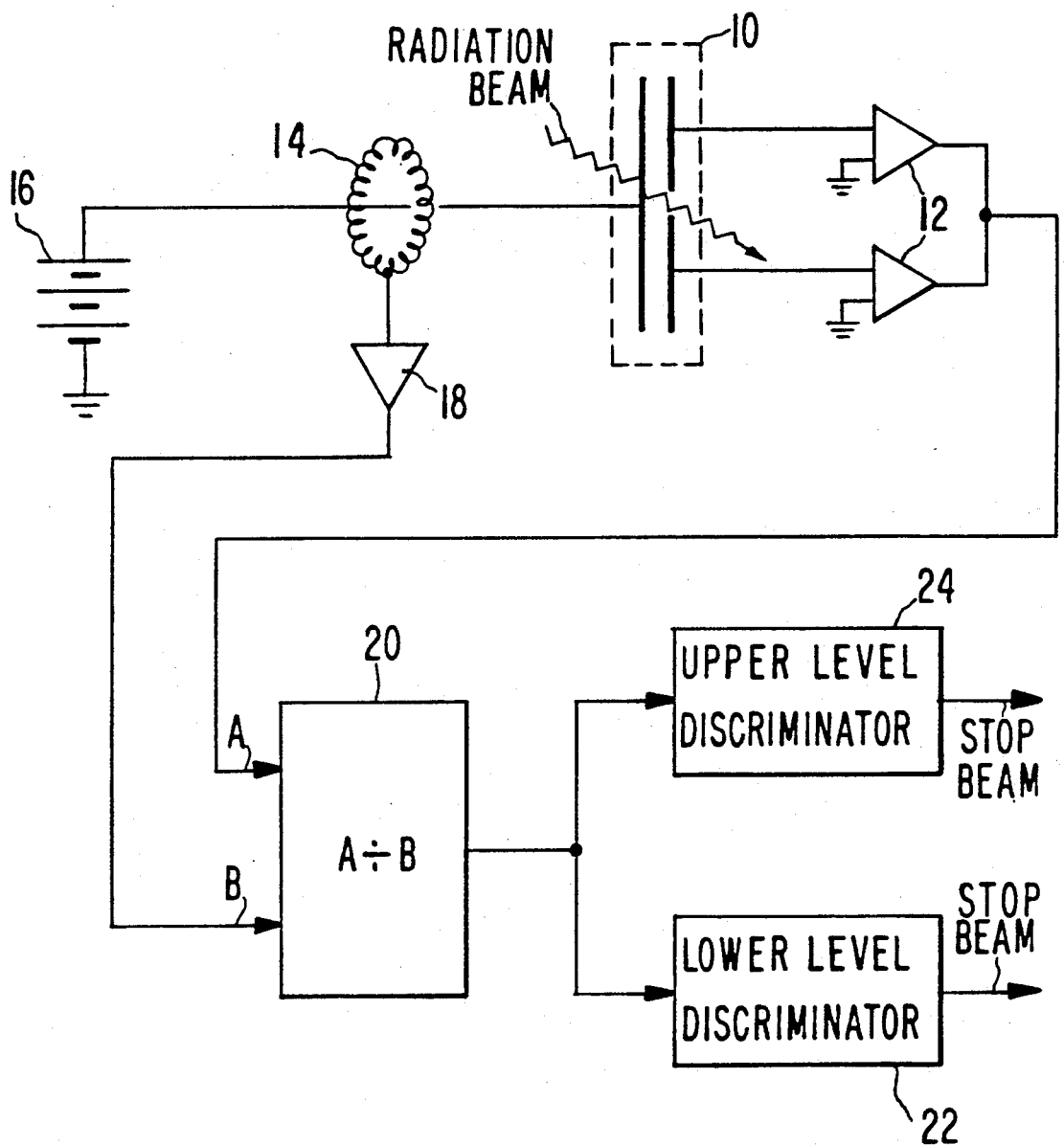
FIG. 1 is a schematic diagram of the apparatus according to the invention showing a means for measuring the current delivered to an ionization chamber by its high voltage power supply.

The following is a glossary of elements and structural members as referenced and employed in the present invention.

10: segmented ionization chamber
12: amplifiers for segments
14: pulse transformer
16: high voltage supply
18: amplifier for signal from pulse transformer
20: ratio circuit
22: lower-level discriminator
24: upper-level discriminator
26: inner electrode
28: outer electrode
30: electrode support
32: pulse transformer for the inner electrode 26
34: pulse transformer for the outer electrode 28
36: interlock circuit
38: pulse transformer for total current
40: total current circuit
42,44: pulse transformers for h.v. electrode segments
50,52: signal electrode segments
54,56: h.v. electrode segments
60: servo/interlock circuit for plane of h.v. electrode segments
64: difference amplifier for signal electrode segments
66: servo/interlock circuit for plane of signal electrode segments
68: summation amplifier for signal electrode signals
70: dose rate monitoring circuit
72: circuit to compare dose rate with total ion chamber current
74,76: h.v. electrode segments, axially symmetric
78,80: pulse transformers for h.v. electrode segments
82: servo/interlock circuit for axially symmetric beam distribution changes

DESCRIPTION OF THE PREFERRED EMBODIMENTS

Referring now to the drawings wherein reference numerals are used to designate parts throughout the various figures thereof, there is shown in FIG. 1 an electronic diagram of the scheme proposed herein. The technique consists of measuring the total ionization current in an ionization chamber by measuring the total current delivered by the high voltage supply to the chamber. This measurement can be in addition to the standard dosimetry system which measures the currents from the various segments of the chamber. An ionization chamber 10, with segmented signal electrodes is used with various amplifying and monitoring circuits 12 to monitor dosage to the various segments. A pulse transformer 14 in series with the high voltage supply 16 to the chamber is adequate for this purpose in the pulsed beams of radiotherapy accelerators. Specifically suggested for this purpose is a toroid pulse transformer because it can be put into place with minimal interruption to the circuit. Current pulses drawn by to the ion chamber produce a voltage signal from the toroid which can be amplified in amplifier 18 and fed to appropriate monitoring circuits. The signal "B" from the amplifier 18 is fed to a ratio circuit 20 together with the total signal "A" from the ionization chamber. The ratio circuit 20 then calculates the ratio in "A"/"B". The output signal from the ratio circuit 20 is then sent to discriminator circuits 22, 24 where preset levels determine when to stop the machine if the ratios are above or below predetermined levels.

This scheme has been tested on an accelerator with a standard segmented ionization detector in normal operation. For these test the voltage pulses from the toroid were amplified then observed on an oscilloscope. The peak pulse current measured by the toroid ranged from 5 milliamps to 22 milliamps, depending upon the mode of operation of the accelerator. Excellent signal-to-noise ratios were observed.

When the machine was operated in the electron beam modes with the electron scattering foils removed, the standard dosimetry system of the accelerator erroneously indicated that very little beam was produced. This was because the most intense portion of the beam passed through insensitive regions of the segmented signal electrodes. In actuality the radiation flux was much more intense than normal in portions of the radiation field. Under these conditions the signal from the toroid decreased only slightly.

TABLE 1

Pulse current levels observed using a toroid on the high voltage ion chamber supply lead for the monitor ionization chamber.

| total ion chamber current measured by toroid | mode | machine output indicated by dosimetry system e foil, x-ray filter | |
|---|---|---|---|
| KV | e or x | in | out |
| 6 | e | 22 ma | 19 ma |
| 12 | e | 14 ma | 11 ma |
| 20 | e | 5.2 ma | 3.6 ma |
| 18 | x | 12 ma | 23 ma |
| | | 300 mu/min. | 73 mu/min. |
| | | 300 mu/min. | 34 mu/min. |
| | | 300 mu/min. | 26 mu/min. |
| | | 300 mu/min. | 489 mu/min. |

Table 1 shows how the toroid signal changed and how the standard accelerator dosimetry system measurements changed when the scattering foils were removed in the electron modes. In the electron irradiation modes (e), the toroid signal changed relatively little compared to the standard dosimetry system output. Also listed is the change observed in an x-ray mode (x) when the flattening filter was removed both the toroid signal and the dosimetry signal increased in this instance, as would be expected from the nature of the beam.

The scheme tested was specifically for pulsed beams because a toroid was used to monitor the current. Another slight variation would be to place the current sensing circuit between the high voltage power supply and circuit ground to eliminate the necessity of high voltage insulation for the sensor.

An interlocking scheme could be operated using signals from the toroid (or other current monitor). Operation of the accelerator could be stopped if the ratio of the toroid signal to the signal from the segments was not within prescribed bounds. Typically, in radiation therapy of human subjects, a variation of 2 to 5% would be used to stop the radiation beam.

Figure 2:
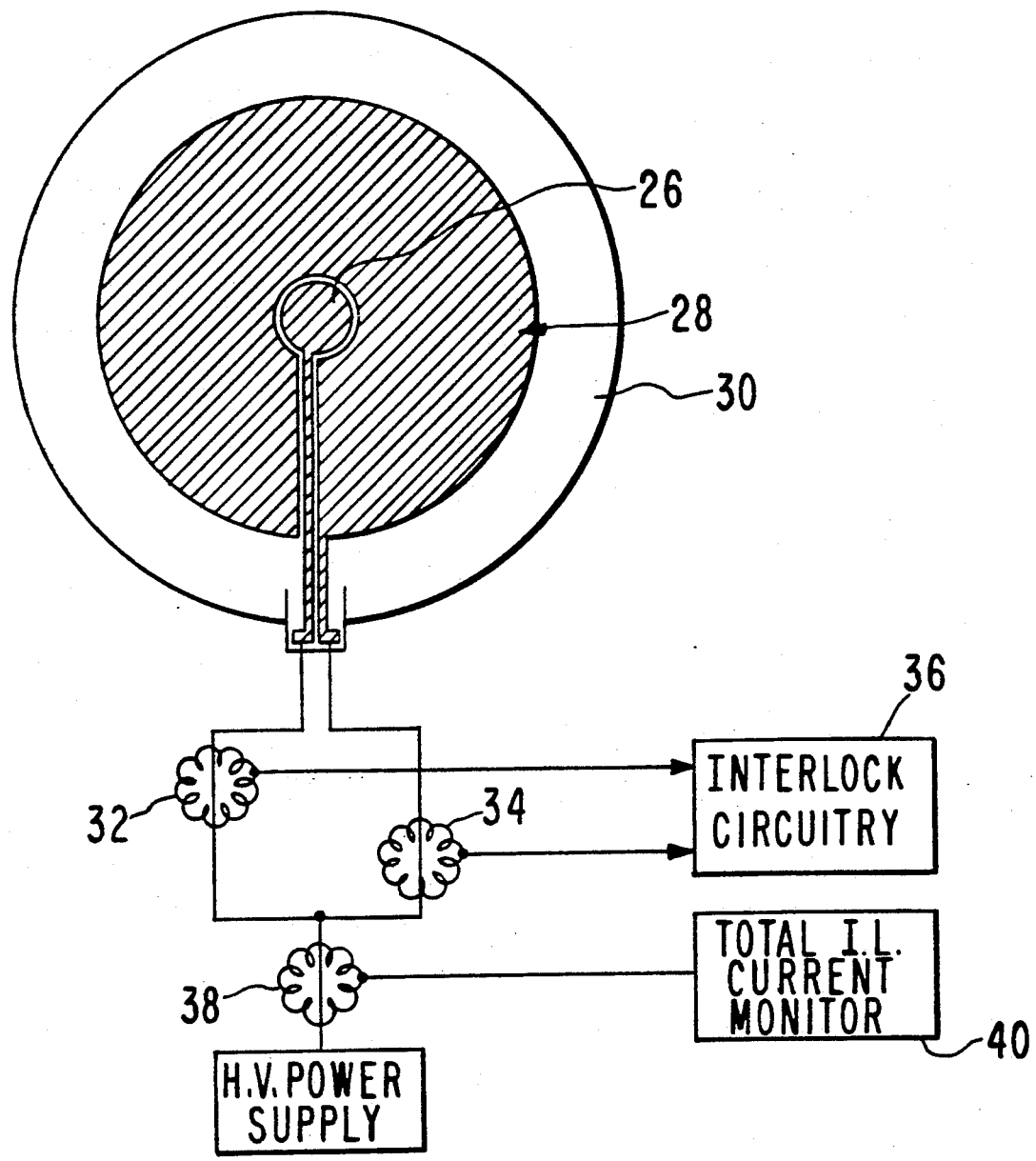
FIG. 2 shows a plan view of a segmented high voltage electrode with associated current monitors. The segmentation scheme shown would provide a means of monitoring axially symmetric beam inhomogeneities.

As an extension to the scheme to measure the current to the high voltage electrode, this electrode could be segmented in a manner similar to the segmentation commonly used for the signal electrodes. FIG. 2 shows a scheme for measuring currents to a segmented high voltage electrode. The high voltage electrode is divided into two concentric electrodes, an inner electrode 26 and an outer electrode 28, both mounted on an insulating support 30. The ratio of currents drawn from these two electrodes will vary if the relative intensity of the radiation changes in an axially symmetric manner, such as would result from changes in beam energy. A pulse transformer 32 on the wire to the inner electrode 26 and a pulse transformer 34 on the wire to the outer electrode 28 are used to monitor the signals from the inner 26 and outer 28 electrode separately. These signals are sent to an interlock circuit 36. Another pulse transformer 38 is used to monitor the signal of the total current to both the inner 26 and outer 28 electrodes. This signal is interpreted by a total current circuit 40.

Figure 3:
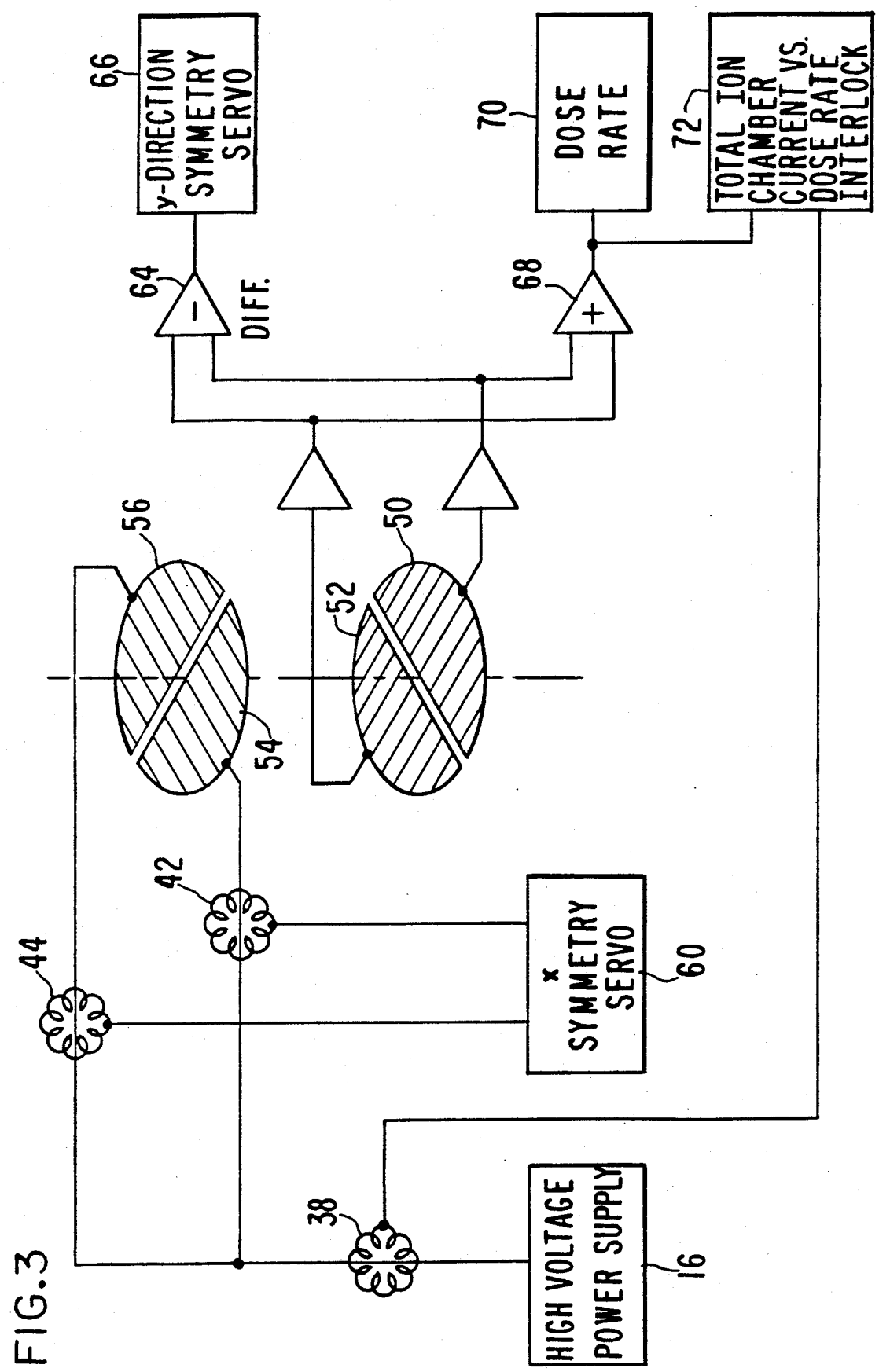
FIG. 3 shows a system combining segmented high voltage electrodes together with segmented signal electrodes, to monitor axially asymmetric beam homogeneity in two orthogonal directions.

Segmented high voltage plates could be used in a chamber in conjunction with segmented signal electrodes. Such a scheme is illustrated in FIG. 3. The high voltage electrode is divided into segments 54 and 56, oriented to respond differentially to beam asymmetries in one plane. Currents supplied to these electrodes are measured by pulse transformers 42 and 44. Signals from these are fed to a servo/interlock circuit, 60, which can operate to correct undesired inhomogeneities or terminate operation.

The signal electrode is divided into segments 50 and 52, oriented orthogonally to the segments of the high voltage plate, 54 and 56. Signals from segments 50 and 52 are amplified and fed to a difference amplifier, 64, whose output goes to servo/interlock circuits, 66. Thus the segmentation of the high voltage plate can be used to monitor and correct for asymmetries in one direction, and the segmentation of the signal plate will monitor and correct for asymmetries in the orthogonal direction.

Total beam intensity is measured by summing the signals from the segments of the signal plate using summation amplifier 68. This result is fed to dose rate monitoring circuits 70. Simultaneously the total ion chamber current is measured using the pulse transformer 38. An interlock circuit 72 compares the sum of the signal plate signals with the total ion chamber current to verify the integrity of the signal plates. Machine operation can be terminated if the measured dose rate and total ion chamber current do not compare favorably.

Figure 4:
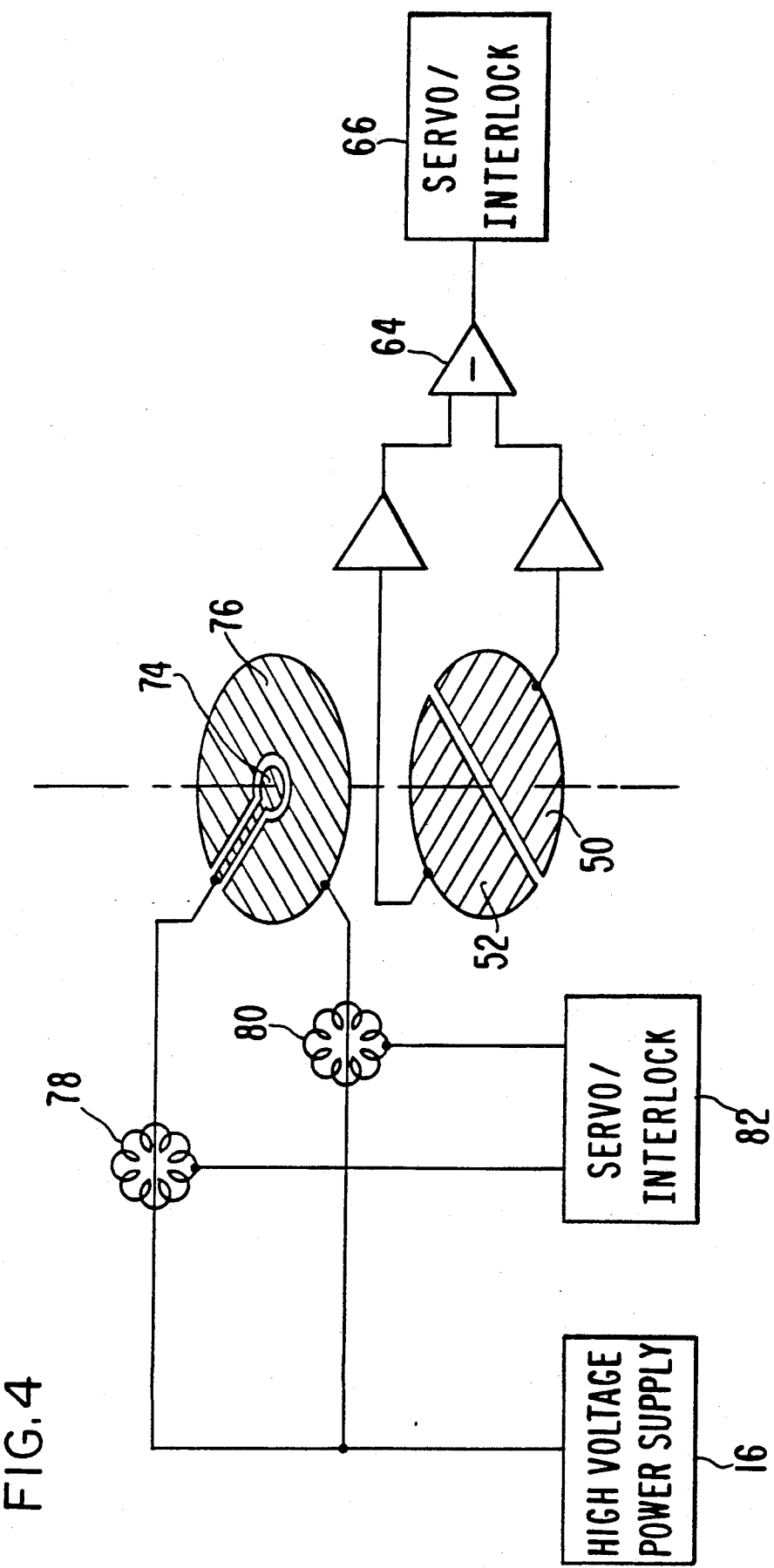
FIG. 4 shows a system to measure both axially symmetric and axially asymmetric beam profile changes by segmenting both the high voltage and the signal electrodes.

Great flexibility in chamber design is achieved by the possibility of segmenting both high voltage and signal electrodes. FIG. 4 illustrates the possibility of monitoring both axially symmetric and axially asymmetric inhomogeneities. The high voltage plate is segmented into two electrodes of different radii, segment 74 to measure the intensity of the beam near the central axis and segment 76 responds to radiation in the periphery of the beam. Currents delivered to these segments by the high voltage supply 16 are monitored by pulse transformers 78 and 80. These signals are fed to servo/interlock circuit 82 for processing. Segments 50 and 52 of the signal electrode are designed to respond differentially to changes in beam distributions which are not symmetric about the beam axis. As described above, the signals are processed by a difference amplifier 64 and fed to a servo/interlock circuit 66.

This invention is not limited to the preferred embodiments and alternatives heretofore described, to which variations and improvements may be made, without departing form the scope of protection of the present patent and true spirit of the invention, the characteristics of which are summarized in the following claims.

What is claimed is:

1. A method of monitoring total ionization current from a pulsed accelerator in a segmented ion chamber having a high voltage electrode connected to a high voltage source and segmented signal electrodes comprising the steps of:

measuring total current supplied to the high voltage electrode of the ionization chamber;

measuring ionization current in the various segmented signal electrodes of the ionization chamber;

summing the ionization currents from the various segmented signal electrodes; and comparing the total current supplied to the high voltage electrode to the sum of the currents from the various segmented signal electrodes.

2. The method of claim 1 wherein said measuring of the current supplied to the high voltage electrode is performed by use of a pulse transformer to couple pulsed ionization current into a measurement circuit.

3. The method of claim 1 wherein an interlock circuit is used to stop the accelerator when the total current supplied to the high voltage electrode exceeds the sum of the currents from the various segments by more than a prescribed amount.

4. The method of claim 1 wherein said high voltage electrode is segmented and the currents from said segmented signal electrodes and said high voltage electrodes are monitored separately.

5. A system for monitoring total ionization current from a pulsed accelerator in a segmented ion chamber having a high voltage electrode connected to a high voltage source and segmented signal electrodes, comprising:
   a means for measuring the total current supplied to the high voltage electrode of the ionization chamber;
   means for measuring ionization current in the various segmented signal electrodes;
   means for summing the ionization currents from the various segmented signal electrodes; and
   means for comparing the total current supplied to the high voltage electrode to the sum of the currents from the various segmented signal electrodes.

6. A system for measuring spatial uniformity of the beams from a radiotherapy accelerator in an ionization chamber, comprising:
   (a) a pair of segmented high voltage electrodes, positioned in a plane, and a pair of segmented signal electrodes oriented orthogonally to the segments of high voltage electrodes;
   (b) means for measuring ionization currents supplied to the high voltage electrodes and first means for comparing said currents supplied to each high voltage electrode as a measure of beam uniformity with respect to the plane of the high voltage electrode segments; and
   (c) means for measuring ionization currents supplied to said segmented signal electrodes and second means for comparing said currents in said signal electrodes, said second means for comparing indicating beam uniformity with respect to directions orthogonal to the plane of the high voltage electrodes.

7. The system of claim 6 wherein the high voltage electrodes are divided into coaxial segments so as to measure axially symmetric beam uniformity and wherein the signal electrodes are segmented so as to measure non-axially symmetric beam uniformity.

8. The system of claim 6 comprising an interlock circuit, said interlock being responsive to at least one of said first and second means for comparing to cause the accelerator to shut down automatically when a comparison of ionization currents in the various segments of the high voltage plate indicates operation outside of prescribed limits.

* * * * *